(12) United States Patent
Goko (10) Patent No.: US 6,519,143 B1
(45) Date of Patent: Feb. 11, 2003

(54) DOCKING STATION

(75) Inventor: Junichi Goko, Yamagata (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 09/656,823

(22) Filed: Sep. 7, 2000

(30) Foreign Application Priority Data

Sep. 17, 1999 (JP) .......................................... 11-264460

(51) Int. Cl.$^7$ ................................................ G05K 1/16
(52) U.S. Cl. ..................... 361/686; 361/683; 312/223.1
(58) Field of Search ............................... 361/683, 686, 361/679; 248/917–923; 312/223.1, 223.2

(56) References Cited

U.S. PATENT DOCUMENTS

| | | | | |
|---|---|---|---|---|
| 5,192,046 A | * | 3/1993 | Howard | 248/918 |
| 5,196,993 A | * | 3/1993 | Herron et al. | 361/686 |
| 5,369,549 A | * | 11/1994 | Kopp et al. | 361/679 |
| 5,535,093 A | * | 7/1996 | Noguchi et al. | 361/686 |
| 5,633,782 A | * | 5/1997 | Goodman et al. | 361/686 |
| 5,687,060 A | * | 11/1997 | Ruch et al. | 361/686 |
| 6,064,373 A | * | 5/2000 | Ditzik | 361/681 |
| 6,081,420 A | * | 6/2000 | Kim et al. | 361/681 |
| 6,091,602 A | * | 7/2000 | Helot | 361/686 |
| 6,108,195 A | * | 8/2000 | Behl et al. | 361/681 |

FOREIGN PATENT DOCUMENTS

| | | | | |
|---|---|---|---|---|
| JP | 2-63119 U | | 5/1990 | |
| JP | 3-223915 A | | 10/1991 | |
| JP | 6-2429 U | | 1/1994 | |
| JP | 06-274244 | * | 9/1994 | ............. G06F/1/16 |
| JP | 8-22342 | | 1/1996 | |
| JP | 8-152939 A | | 6/1996 | |
| JP | 9-160694 A | | 6/1997 | |
| JP | 11-95870 A | | 4/1999 | |

* cited by examiner

*Primary Examiner*—Darren Schuberg
*Assistant Examiner*—Lisa Lea-Edmonds
(74) *Attorney, Agent, or Firm*—Sughrue Mion, PLLC (57) ABSTRACT

A docking station for connection to a notebook personal computer can be set up horizontally or vertically depending upon user preference. A base for an LCD panel, which can be attached to and detached from the docking station, is connected to a docking station connector by a docking connector for the LCD base. The docking station is equipped with an external interface panel capable of being set at any angle by a panel angle adjuster, and with a PC connector for connection to a notebook personal computer having a detachable LCD. The docking station has a basic docking station function that allows devices and expansion boards to be added on. The LCD base is constituted by an LCD-base cable connector, a keyboard connector, a CRT-display connector, a speaker and an LCD angle adjuster.

21 Claims, 7 Drawing Sheets

(BACK)

DOCKING STATION

FIELD OF THE INVENTION

This invention relates to a docking station for use with a notebook personal computer and, more particularly, to a space-saving docking station having a structure that allows the docking station to be installed in accordance with the preference of the user.

BACKGROUND OF THE INVENTION

Figure 11:
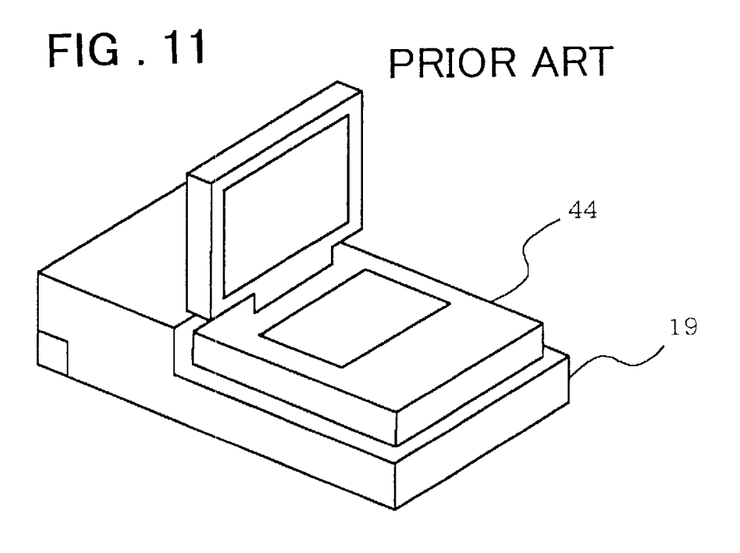
FIG. 11 is a perspective view illustrating a data communication system according to the prior art and a notebook personal computer.

FIG. 11 is a perspective view illustrating a docking station 19 according to the prior art and a personal computer 44. As shown in FIG. 11, the conventional docking station 19 is placed horizontally and the personal computer 44 is mounted on the top of the docking station 19.

The specification of Japanese Patent Kokai Publication JP-A-8-22342 entitled "Automatic Docking Station for Portable Computers" discloses a docking station having connectors for connecting components such as a monitor and keyboard, and a drive motor for engaging internal connectors of the docking station with connectors on the portable PC.

SUMMARY OF THE DISCLOSURE

The following problem has been encountered in the course of the investigation toward the present invention.

That is, when a docking station is set up in accordance with the prior art, the space required for installation is equivalent to the size of the apparatus, and almost all of the desktop is occupied by a CRT monitor, the docking station and a keyboard, etc. Even if the docking station is installed at a location other than the desktop and use is made of an external keyboard and CRT monitor, inconvenience is involved owing to the lengths of the associated cables and the routing of the cables.

According to the aforementioned Japanese Patent Kokai Publication JP-A-8-22342, the "Automatic Docking Station for Portable Computers" is set up horizontally and therefore requires enough installation space to accommodate the size of the apparatus proper. Most of the desktop space is taken up by the CRT monitor, docking station and keyboard, etc.

Accordingly, an object of the present invention is to provide a docking station for connection to a notebook personal computer, wherein the docking station can be set up horizontally or vertically depending upon user preference, thereby taking up less desktop space, and wherein routing of cables is facilitated and simplified.

According to a first aspect of the present invention, the foregoing object is attained by providing a docking station for connection to a notebook personal computer, characterized by having a structure that enables the docking station to be set up horizontally or vertically depending upon user preference.

According to a second aspect of the present invention, the foregoing object is attained by providing a docking station for connection to a notebook personal computer, characterized by having a structure that enables the docking station to be set up horizontally or vertically depending upon user preference by rotating an external interface connector of the docking station.

According to a third aspect of the present invention, the foregoing object is attained by providing a docking station for connection to a notebook personal computer having a detachable LCD panel which includes a signal input terminal that allows the LCD panel to present a display in a state in which it has been detached from the notebook personal computer, the locking station having a structure that enables the docking station to be set up horizontally or vertically depending upon user preference by connecting the notebook personal computer, from which the LCD panel has been detached, to the docking station and rotating an external interface connector of the docking station, the docking station having an LCD base attachable to and detachable from the docking station, wherein when the LCD base is detached from the docking station, the LCD base is connected to the docking station by a cable and has the LCD panel mounted thereon.

The LCD base preferably has an angle adjuster that allows the LCD panel to be fixed at any angle.

Further, the LCD base preferably has a keyboard interface, a CRT interface and a speaker.

In a preferred embodiment, the docking station further includes a keyboard interface, a CRT interface and a speaker.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
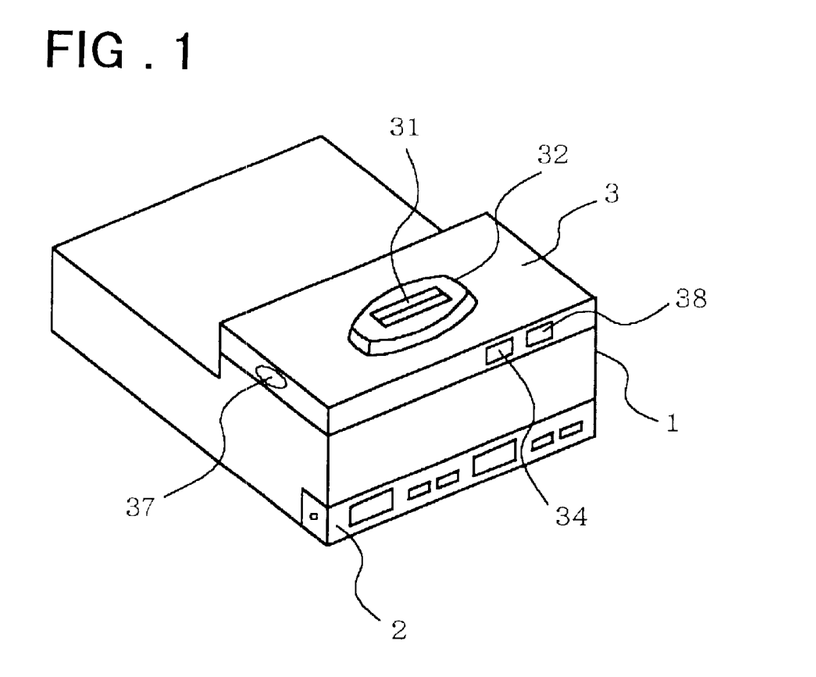
FIG. 1 is a perspective back view illustrating a docking station according to an embodiment of the present invention.
Figure 2:
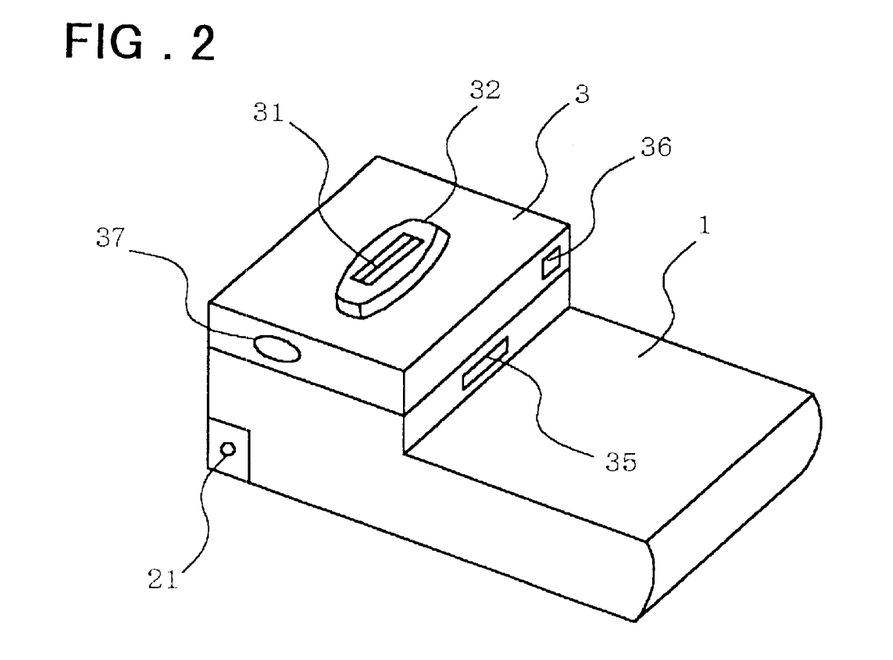
FIG. 2 is a perspective front view illustrating the docking station according to the embodiment.

FIG. 1 is a perspective back view illustrating a docking station 1 according to an embodiment of the present invention, and FIG. 2 is a perspective front view illustrating the docking station 1 according to this embodiment.

As shown in FIGS. 1 and 2, the docking station 1 has a detachable LCD base 3 mounted thereon. The LCD base 3 attachable to and detachable from the docking station 1 is connected by an LCD-base docking connector 33 to a docking station connector 11 (described later) shown in FIG. 3. The docking station 1 is equipped with an external interface panel 2 capable of being set at an angle by a panel angle adjuster 21, and with a PC connector 35 for connection to a notebook personal computer 4 having a detachable LCD. The docking station 1 further has a basic docking station function that allows devices and expansion boards to be added on.

The LCD base 3 is constituted by a LCD-base cable connector 38, a keyboard connector 36, a CRT-display connector 34, a speaker 37 and an LCD angle adjuster 32. An LCD connector 31 is provided on the LCD angle adjuster 32. The LCD angle adjuster 32 can be set at any angle.

Figure 3:
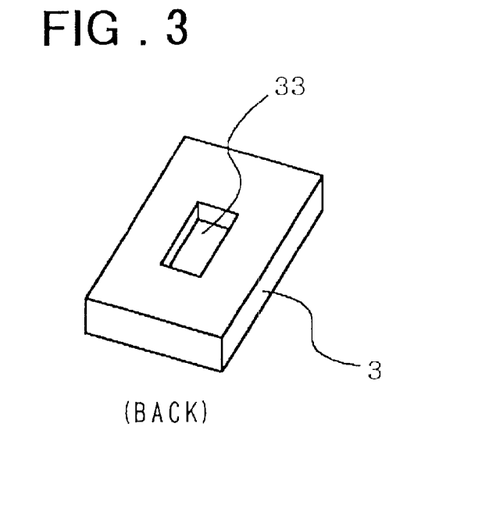
FIG. 3 is a perspective view illustrating a connector on the underside (back) of an LCD base according to the embodiment.

FIG. 3 is a perspective view illustrating the LCD-base docking connector 33 on the underside of the LCD base 3. Specifically, the LCD-base docking connector 33, which is for making the connection to the docking station 1, is mounted on the underside of the LCD base 3.

The docking station 1 according to this embodiment of the present invention is connected to the notebook personal computer 4 in a manner which will now be described.

Figure 4:
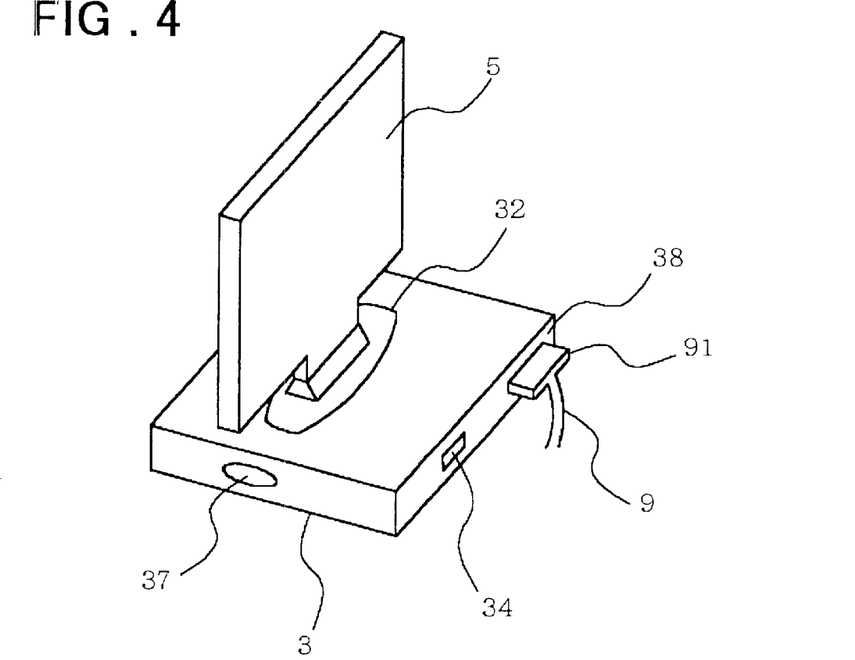
FIG. 4 is a perspective view in which the LCD base has been detached from the docking station and mounts an LCD display according to the embodiment.
Figure 5:
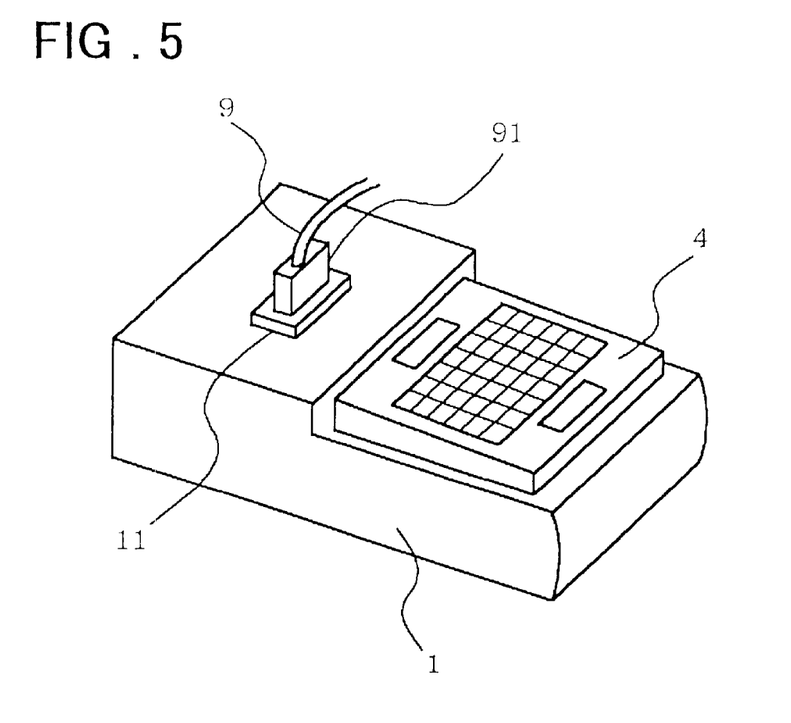
FIG. 5 is a perspective view in which a notebook personal computer having a detachable LCD panel has been mounted on the docking station according to the embodiment.

FIG. 4 is a perspective view in which the LCD base 3 has been detached from the docking station 1 and has an LCD display 5 mounted thereon, and FIG. 5 is a perspective view in which a notebook personal computer 4 having the detachable LCD panel has been mounted on the docking station 1 according to this embodiment.

As illustrated in FIGS. 4 and 5, the notebook personal computer 4 is connected to the docking station 1 by the PC connector 35. The docking station 1 and the LCD base 3 are connected by a cable 9 via the docking station connector 11, LCD-base cable connector 38 and a cable connector 91. The LCD display 5, which has been detached from the notebook personal computer 4, is inserted into the LCD connector 31 of LCD base 3.

Connection of the keyboard and CRT display to the notebook personal computer in the docking station 1 of this embodiment will be described next.

Figure 6:
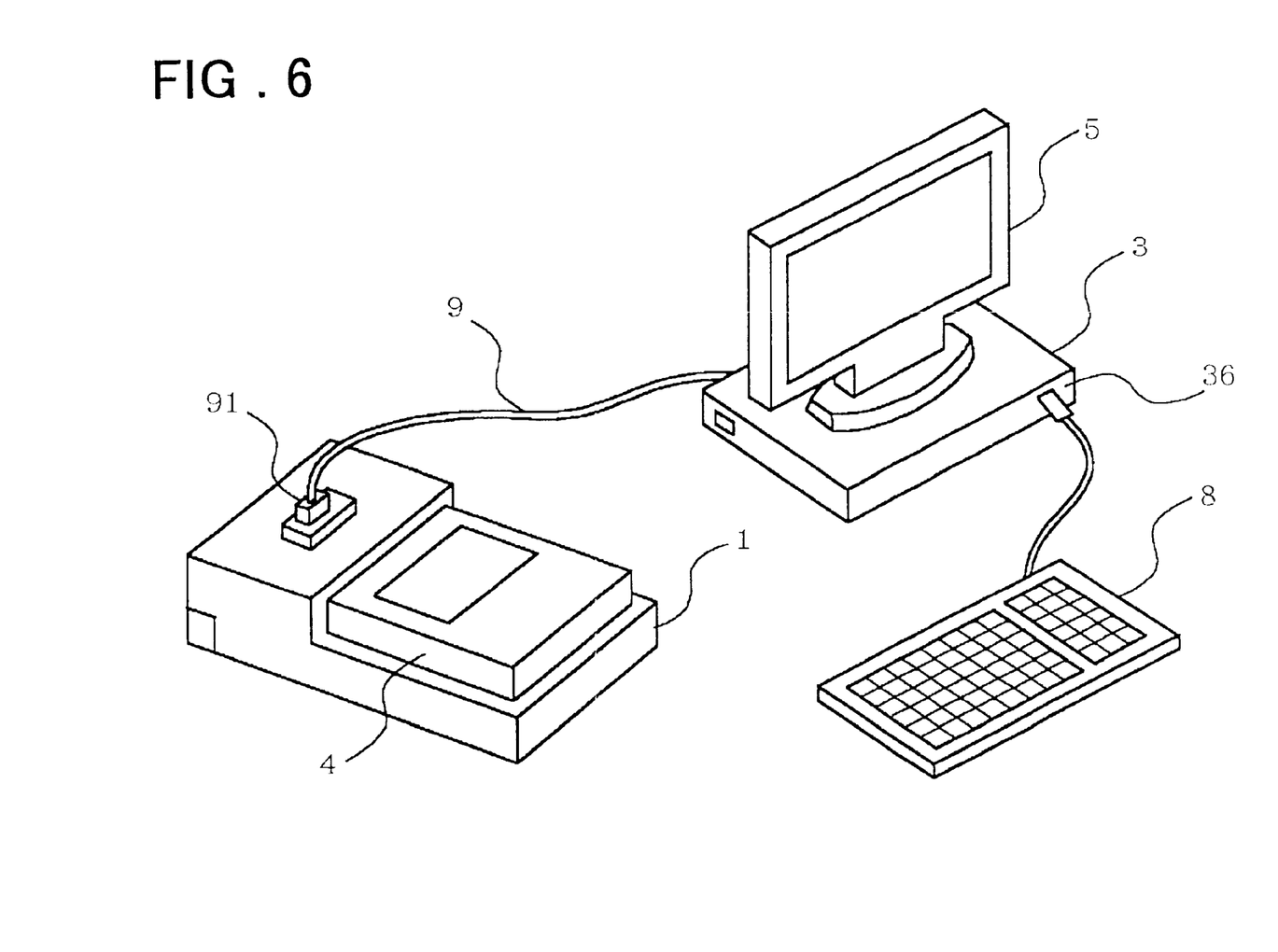
FIG. 6 is a perspective view in which the notebook personal computer having the detachable LCD panel has been mounted on the docking station, the LCD base has been detached from the docking station and connected to it by a cable, and the LCD display and a keyboard have been connected to the LCD base.
Figure 7:
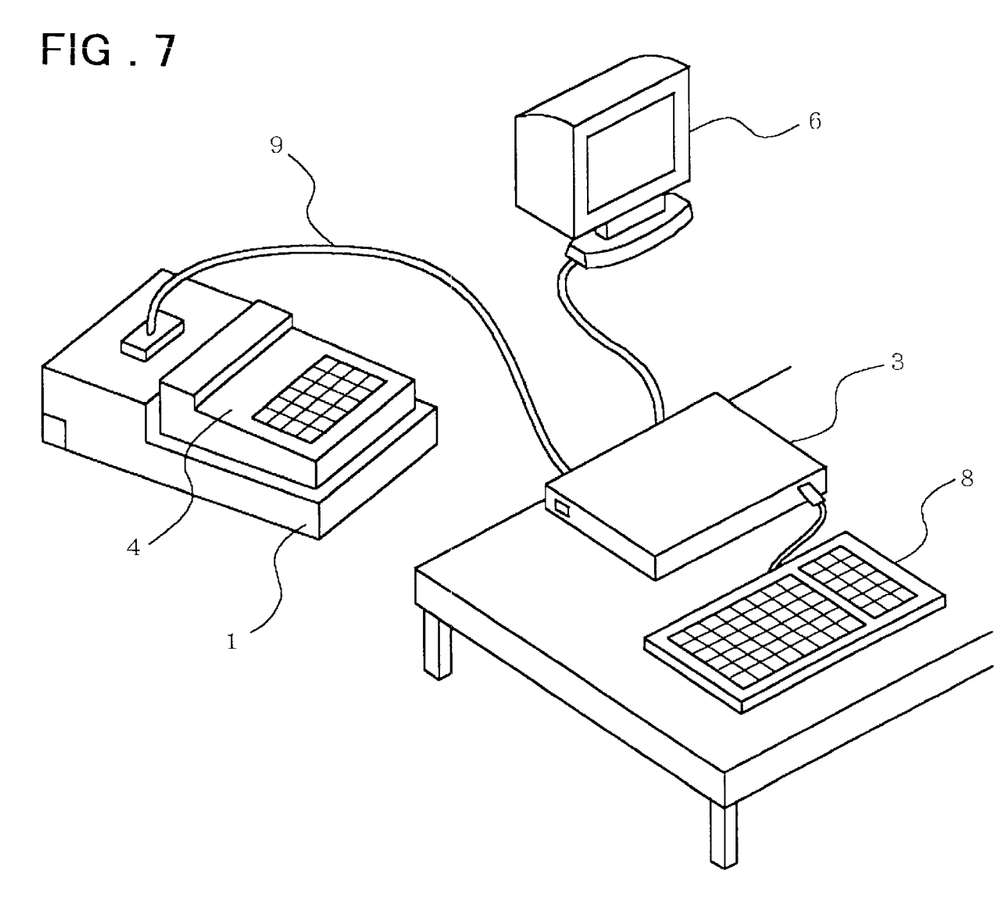
FIG. 7 is a perspective view in which the notebook personal computer having the detachable LCD panel has been mounted on the docking station, the LCD base has been detached from the docking station and connected to it by a cable, and a CRT display and the keyboard have been connected to the LCD base.

FIG. 6 is a perspective view in which the notebook personal computer 4 having the detachable LCD has been mounted on the docking station, the LCD base 3 has been detached from the docking station 1 and connected to it by the cable 9, and the LCD display 5 and a keyboard 8 have been connected to the LCD base 3. FIG. 7 is a perspective view in which the notebook personal computer 5 having the detachable LCD has been mounted on the docking station 1, the LCD base 3 has been detached from the docking station 1 and connected to it by the cable 9, and a CRT display 6 and the keyboard 8 have been connected to the LCD base 3. The keyboard 8 is connected to the LCD base 3 via the keyboard connector 36, and the CRT display 6 is connected to the LCD base 3 via the CRT-display connector 34.

A case in which the docking station 1 of this embodiment is set up vertically will now be described.

Figure 8:
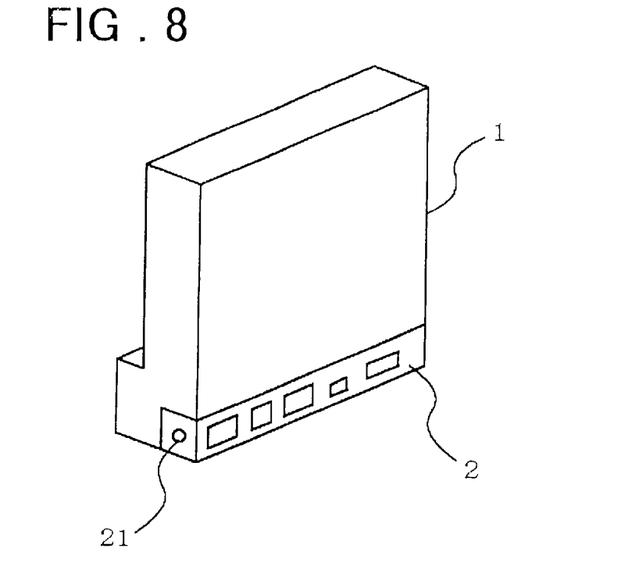
FIG. 8 is a perspective back view illustrating the docking station set up vertically according to the embodiment.
Figure 9:
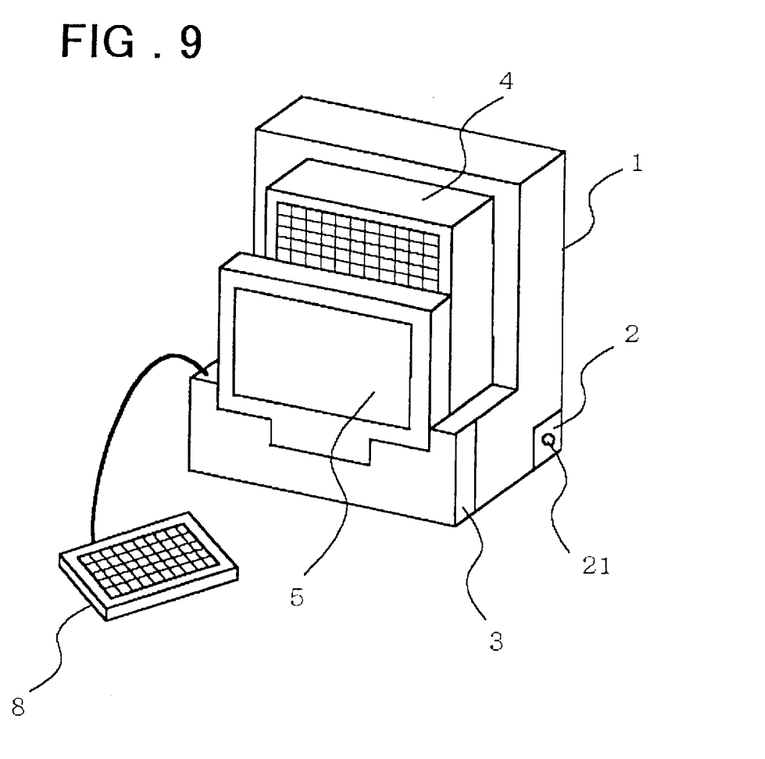
FIG. 9 is a perspective view in which the docking station has been set up vertically and mounts the notebook personal computer and the LCD display detached from the notebook personal computer, the detached LCD display being rendered vertical by an LCD angle adjuster according to the embodiment.

FIG. 8 is a perspective back view illustrating the docking station 1 set up vertically, and FIG. 9 is a perspective view in which the docking station 1 has been set up vertically and mounts the notebook personal computer 4 and the LCD display 5 detached from the notebook personal computer 4, the detached LCD display 5 being rendered vertical by the LCD angle adjuster 32. In this case, owing to the action of the panel angle adjuster 21, the external interface panel 2 does not face the bottom of the docking station 1 but instead constitutes the outwardly facing side of the docking station. This makes it possible to connect various cables. In addition, the LCD base 3 is connected to the docking station 1. The notebook personal computer 4 having the detachable LCD is connected to the docking station 1. The LCD display is inserted into the LCD connector 31 and can be set at any position by adjusting the LCD angle adjuster 32.

A case in which the docking station 1 is set up vertically and a notebook personal computer 45 having a rotatable LCD is mounted on the docking station 1 will now be described.

Figure 10:
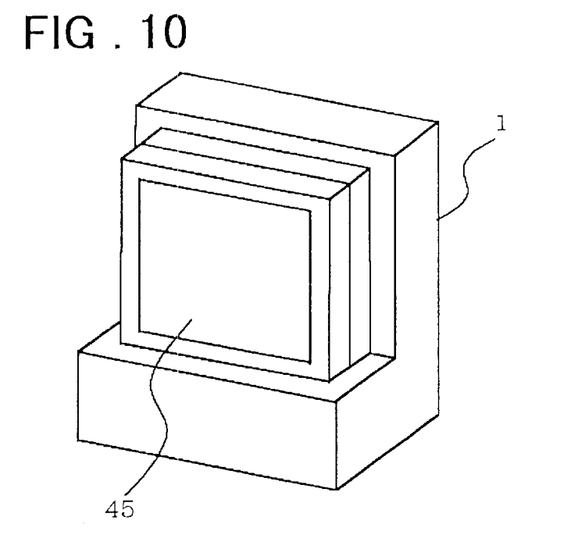
FIG. 10 is a perspective view in which the docking station has been set up vertically and mounts a notebook personal computer having a rotatable LCD panel according to the embodiment.

FIG. 10 is a perspective view in which the docking station 1 has been set up vertically and mounts the notebook personal computer 45 having a rotatable LCD.

Here the notebook personal computer 45 having the rotatable LCD is of the type in which the display can be rotated to the rear of the docking station 1. With the docking station 1 and LCD base 3 connected together, the display of the notebook personal computer 45 is pointed toward the rear. The docking station 1 is set up vertically by pointing the external interface panel 2 of the docking station 1 toward the front side to make the docking station 1 upright. This makes it possible for the personal computer to be used as one that conserves space.

Now, referring to FIG. 1 and FIG. 8 in comparison to each other, the external interface panel 2 (i.e., external interface connector) assumes at least two angular positions different from each other by 90 degrees. Any one of these two positions of the external interface panel 2 corresponds to the horizontal set up position (FIG. 1) or the vertical (upright) set up position (FIG. 8) of the docking station, respectively, so as to provide an open panel face accessible from the exterior (i.e., open to the exterior) irrespective of this set up positions.

This convertible set up of the external interface panel 2 is assured, e.g., by an angle adjuster 21 for the panel (FIG. 2, FIG. 8). By this configuration, the external interface panel is convertibly directed to an open side of the docking station at a horizontal or vertical set up position thereof.

Now referring to FIGS. 2 and 9, the LCD base 3 is detachably mounted (i.e., connected) to a stepped up surface of the docking station 1, and the stepped up surface is disposed as a top (highest) surface of the docking station 1 at its horizontal set up position (FIG. 2). The stepped up surface will assume a frontmost surface on which the LCD base 3 is disposed at the upright (vertical) set up position of the docking station 1 (FIG. 9). In this position, the LCD display 5 may be set up at at the upright position too, by virtue of the LCD angle adjuster 32 as compared to FIG. 4. In this embodiment, the LCD angle adjuster 32 is disposed on the top surface of the LCD base 3 so as to allow the set up rotation of the LCD display 5 through at least 90 degrees, or preferably more.

The LCD angle adjuster 32 per se is also detachably mounted to the LCD base 3 on the one hand and on the other hand formed as an LCD connector 31 (or in other words, has an LCD connector 31).

The foregoing embodiment illustrates an example of a notebook personal computer in which the LCD can be detached. However, effects similar to those of the foregoing embodiment may be obtained also by providing a separate LCD unit. Further, the LCD base 3 can be used as a wall-mounted type LCD base.

The meritorious effects of the present invention are summarized as follows.

By virtue of the present invention, installation space can be reduced to about half that of the prior art if the docking station 1 is set up vertically. In a case where components are set up in separated form, installation space can be reduced to about one-half to one-third when the LCD is used. This makes it possible to utilize desktop space effectively. As for the routing of cables when the components are set up in separated form, one cable is used to connect the docking station 1 and the LCD base 3. If optical communication is adopted, there are no cables between the docking station 1 and the LCD base 3. As a result, peripherals such as a keyboard can be added on and changed much more easily than in the prior art.

In this case, installation space on the desktop can be reduced by using the LCD base 3 on the side of the docking station 1 in a form separated from the docking station, as illustrated in FIG. 5. Since the separated LCD base 3 is equipped with ports for equipment such as a keyboard, CRT, USB device or sound device used by a user at the desktop, the routing of cables for this equipment is facilitated greatly.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A docking station for connection to a notebook personal computer, said docking station having an external interface connector, wherein said docking station is operable to allow the docking station to be set up horizontally or vertically depending upon user preference by rotation of said external interface connector.

2. A docking station for connection to a notebook personal computer having a detachable LCD panel which includes a signal input terminal that allows the LCD panel to present a display in a state in which it has been detached from the notebook personal computer;

said docking station comprising:

an external interface connector, and an LCD base attachable to and detachable from the docking station wherein said docking station has a structure that enables the docking station to be set up horizontally or vertically depending upon user preference by connecting the notebook personal computer, from which the LCD panel has been detached, to the docking station at a rotatable position of said external interface connector; and wherein when the LCD base is detached from the docking station, said LCD base is connected to the docking station by a cable and has the LCD panel mounted thereon.

3. The docking station according to claim 2, wherein said LCD base has an angle adjuster that allows said LCD panel to be fixed at any angle.

4. The docking station according to claim 2, wherein said LCD base has a keyboard interface, a CRT interface and a speaker.

5. The docking station according to claim 1, further including a keyboard interface, a CRT interface and a speaker.

6. The docking station according to claim 1, wherein said external interface connector is rotatable between at least two positions for said horizontal and vertical set up of the docking station.

7. The docking station according to claim 2, wherein said external interference connector assumes at least two positions for said horizontal and vertical set up of the docking station.

8. A docking station for connection to a notebook personal computer, said docking station having an external interface connector, wherein said docking station is operable to allow the docking station to be set up horizontally or vertically depending upon user preference by rotation of said external interface connector, wherein said external interface connector is set up to the docking station by an angle adjuster.

9. The docking station according to claim 2, wherein said external interface connector is set up to the docking station by an angle adjuster.

10. A docking station for connection to a notebook personal computer having a detachable LCD panel which includes a signal input terminal that allows the LCD panel which includes a signal input terminal that allows the LCD panel to present a display in a state in which it has been detached from the notebook personal computer;

said docking station comprising:

an external interface connector, and an LCD base attachable to and detachable from the docking station, wherein said docking station has a structure that enables the docking station to be set up horizontally or vertically depending upon user preference by connecting the notebook personal computer, from which the LCD panel has been detached, to the docking station at a rotatable position of said external interface connector;

wherein when the LCD base is detached from the docking station, said LCD base is connected to the docking station by a cable and has the LCD panel mounted thereon; and wherein said external interface connector is set up to the docking station by an angle adjuster.

11. The docking station according to claim 2, wherein said external interference connector has an external interface panel convertibly directed to an open side of the docking station at a horizontal set up position or vertical set up position of the docking station.

12. The docking station according to claim 2, wherein said LCD base is detachably mounted to a stepped up surface of the docking station, said stepped up surface being disposed as a top surface of the docking station at its horizontal set up position.

13. A docking station for connection to a personal notebook computer, said docking station comprising a rotatable external interface connector, whereby said rotatable external interface connector is rotatable to an open side of said docking station that is accessible from the exterior when said docking station is in a horizontal or vertical position.

14. The dock station according to claim 13, wherein said rotatable external interface connector is adjustable to at least two angular positions.

15. The docking station according to claim 13, wherein said rotatable external interface connector is adjustable to at least two angular positions that differ by 90°.

16. The docking station according to claim 13, wherein said rotatable external interface connector is rotatable over a range of at least 90°.

17. The docking station according to claim 13, wherein said rotatable external interface connector is capable of being set at any angle.

18. The docking station according to claim 13, wherein said docking station further comprises an LCD angle adjuster for rotating said external interface connector.

19. The docking station according to claim 18, wherein said LCD angle adjuster includes an LCD connector.

20. The docking station according to claim 18, wherein said LCD angle adjuster is capable of being set at any angle.

21. The docking station according to claim 13, wherein said docking station further comprises an attachable and detachable LCD base.

* * * * *